United States Patent
Pandharipande et al.

(10) Patent No.: US 9,497,829 B2
(45) Date of Patent: Nov. 15, 2016

(54) METHODS FOR ADAPTIVELY CONTROLLING LIGHTING BASED UPON TRAFFIC IN AN OUTDOOR LIGHTING NETWORK

(71) Applicant: KONINKLIJKE PHILIPS N.V., Eindhoven (NL)

(72) Inventors: Ashish Vijay Pandharipande, Eindhoven (NL);
(Continued)

(73) Assignee: Koninklijke Phillips N.V., Eindhoven (NL)

( * ) Notice: Subject to any disclaimer, the term of this patent is extended or adjusted under 35 U.S.C. 154(b) by 101 days.

(21) Appl. No.: 14/397,519

(22) PCT Filed: Apr. 22, 2013

(86) PCT No.: PCT/IB2013/053161
§ 371 (c)(1),
(2) Date: Oct. 28, 2014

(87) PCT Pub. No.: WO2013/164726
PCT Pub. Date: Nov. 7, 2013

(65) Prior Publication Data
US 2015/0123546 A1    May 7, 2015

Related U.S. Application Data

(60) Provisional application No. 61/641,618, filed on May 2, 2012.

(51) Int. Cl.
H05B 33/08    (2006.01)
H05B 37/02    (2006.01)

(52) U.S. Cl.
CPC ...... *H05B 37/0227* (2013.01); *H05B 37/0245* (2013.01); *Y02B 20/72* (2013.01)

(58) Field of Classification Search
CPC ............ H05B 33/0845; H05B 33/0851; H05B 33/0854; H05B 33/0842; H05B 37/02;
(Continued)

(56) References Cited

U.S. PATENT DOCUMENTS

2003/0016129 A1    1/2003    Menard
2010/0029268 A1    2/2010    Myer
(Continued)

FOREIGN PATENT DOCUMENTS

CN    1973490 A    5/2007
EP    2271184 A1    1/2011
(Continued)

*Primary Examiner* — Thai Pham
*Assistant Examiner* — Jianzi Chen

(57) ABSTRACT

Methods for an outdoor lighting network (100) are disclosed. The methods can adaptively control lighting requirements based upon traffic in the outdoor lighting network (100). The adaptive control provides illumination over a certain response range based upon detection of an object (20) and in addition possibly a velocity of the object (20) by a lighting unit (LUs 1-8) equipped with a sensor (12) For the outdoor lighting network (100), the disclosed methods include deciding when a control message should be transmitted to other lighting units (LUs 1-8), selecting one or more control messaging protocols with modes adapted to achieve a response range depending on the velocity of the object (20) and controlling behavior of a light level output of the lighting unit (LU 1-8).

19 Claims, 2 Drawing Sheets

(72) Inventors: Haixu Wang, Eindhoven (NL);
Hongming Yang, Eindhoven (NL)

(58) Field of Classification Search
CPC ............ H05B 37/0218; H05B 33/0848; H05B 33/0866; H05B 33/0872; H05B 33/0884; H05B 41/36; H05B 33/08; H05B 39/04; H05B 39/041
USPC ............ 315/185 R, 192, 291, 294, 297, 299, 315/300, 302, 307, 308, 312
See application file for complete search history.

(56) References Cited

U.S. PATENT DOCUMENTS

| | | | |
|---|---|---|---|
| 2010/0264853 A1* | 10/2010 | Amutham | H05B 37/0227 315/313 |
| 2012/0038281 A1 | 2/2012 | Verfuerth | |
| 2014/0001961 A1* | 1/2014 | Anderson | H05B 37/0227 315/153 |

FOREIGN PATENT DOCUMENTS

| | | | |
|---|---|---|---|
| EP | 2320713 | A2 | 5/2011 |
| GB | 2444734 | A | 6/2008 |
| WO | 2009003279 | A1 | 1/2009 |
| WO | 2010125325 | A1 | 11/2010 |

* cited by examiner

L5  L4  L3  L2  L1     R1  R2  R3  R4  R5
Id(local detection)

L3  L2  L1     R1  R2  R3
Id(local detection)

METHODS FOR ADAPTIVELY CONTROLLING LIGHTING BASED UPON TRAFFIC IN AN OUTDOOR LIGHTING NETWORK

CROSS-REFERENCE TO PRIOR APPLICATIONS

This application is the U.S. National Phase application under 35 U.S.C. §371 of International Application No. PCT/IB2013/053161, filed on Apr. 22, 2013, which claims the benefit of U.S. Provisional Patent Application No. 61/641,618, filed on May 2, 2012. These applications are hereby incorporated by reference herein.

The present invention relates to various methods and protocols for adaptive lighting in an outdoor lighting network, more particularly, methods to adaptively decide based upon traffic patterns on light level/dimming requirements for outdoor lighting units that use decision protocols on when a control message should be transmitted and control messaging protocols with adaptive modes.

Outdoor lighting networks (OLNs) are increasingly becoming intelligent, with sensors, actuators and communication modules in lighting unit/pole installations that can respectively detect the presence of objects, control the dimming of luminaries, and communicate relevant control information across the lighting system. Smart dimming strategies that are adapted in accordance with object detection conditions can help in achieving energy efficiency. Light pollution is also reduced by dimming selectively to ensure a certain response behavior as compared to a system that has all lighting units/poles constantly on.

Conventional sensors, e.g., passive infrared (PIR) sensors, cameras, in the OLN give out binary detection results. Such conventional sensors may send a "detection" result if an object is detected within the sensing range of the sensor. The sensor may also periodically attempt to detect objects within the sensing range and if an object is detected, a "detect" results, or else a "no detection" results.

A conventional control protocol based on binary detection results works as follows. Based upon a local detection or non-detection via a sensor, the lighting unit broadcasts a message periodically. A lamp at the lighting unit goes ON if it has a local detection or receives at least one ON message in a received broadcast message from another lighting unit in the vicinity. The lamp goes OFF if it receives an OFF message in the broadcast messages and has no local detection, or if a timer expires. Such conventional protocols, while being simple, incur a large error rate in expected dimming behavior and also suffer from a large communication message overhead. The performance of such conventional protocols may be improved to a certain extent by improving sensing and communication reliability. However, this requires very careful and laborious (expensive and time-consuming) configuration/commissioning of the sensors and the communication modules.

With radar sensors, for example, based on Doppler or FMCW (frequency modulated continuous wave), it is possible to extract additional traffic information related to the detected object's velocities, within the sensing range of the sensor. Using such velocity information offers the potential of improving dimming behavior in the OLN. However, the sensing is typically error-prone which may lead to missed detections and false alarms. Further, the detected velocity may have limited accuracy. For example, the estimated velocity may be different from the actual velocity within an uncertainty range. Moreover, communications links across light units/poles such as wireless links are error-prone (due to fading, shadowing conditions, etc.) and range-limited. In this regard, accurate communication is not guaranteed, but there is a probability associated with communication between any two lighting units/poles being successful. Furthermore, received power degrades with distance and hence successful communication may occur only up to a certain distance, which is termed the communication range.

Accordingly, a need exists in the art for methods and protocols to address the shortcomings of the conventional protocols and conventional OLN systems noted above.

It is one object of the present invention to present control methods for determining the dimming behavior of lighting units (LUs) in an OLN so that the dimming performance is improved.

Another object of the present invention to present communication protocols for messaging between and among LUs in the OLN to meet or exceed required response performance.

Another object of the present invention is to improve the energy savings in the OLN and/or reduce light pollution by providing appropriate light levels conforming to expected dimming behavior.

Another object of the present invention is to reduce the communication message overhead between LUs.

One feature of the present invention is to use a lighting/dimming control protocol that uses the detected object's velocity to adapt the LU response range. In this regard, the response range can be considered the number of the LUs that should be turned "ON" or "OFF" based upon the detection. For example, in the direction of the detected object, one or more additional LUs should be turned "ON" when a first LU has detected the object. The response range can be selected based upon a distance from the first LU and/or a number of additional LUs (assuming a known spacing between the additional LUs).

Another feature of the present invention is related to decision criteria to determine a "true detection" based on a local detection result, in combination with velocity detection results from neighboring lighting units obtained by way of a control message.

It is noted that one conventional attempt to set a light level of a lighting unit in dependence to a sensor determining a position and velocity of an object is disclosed in EP2271184 A1. As understood by inventors, a master controller is described that communicates a dimming command so that slave light sources can achieve an illumination profile. This reference, however, is not understood to disclose the distributed communication and control protocols described in the present invention related to decision rules on when a control message should be transmitted, (ii) content of the communication message, and control messaging protocols with modes adapted to achieve a response range depending on object velocity, and (iii) designed decision rules at the lighting poles to decide dimming behavior. Moreover, the reference is understood to disclose that a current sensor detection result, in combination with previous sensor results and neighboring ones and/or the light actuation results, can be used in a distributed way to decide illumination behavior.

Another feature of the present invention is related to a method to reduce communication overhead in the OLN using criteria for each lighting unit to decide whether or not to send the control message to neighboring LUs.

In one embodiment, the present invention is directed to a method for controlling a plurality of lighting units in an outdoor lighting network. The method includes the steps of detecting a vehicle within a sensing range of the lighting unit and confirming that the detection is true. If the detection is confirmed a response range is determined based upon a velocity of the vehicle. One of several messaging protocols is then selected based upon the determined response range and a control message is sent, using the selected one messaging protocol, to other selected lighting units to control a light level of the other lighting units.

In another embodiment, the present invention directed to a method for controlling a light level output of a lighting unit in an outdoor lighting network. The method includes the steps of determining if there is a true location detection and/or an ON control message is received by the lighting unit. The true location detection is determined by detecting an object within a sensing range of the lighting unit and confirming the detection. The ON control message is determined by receiving a control message from another lighting unit in the outdoor lighting network where the control message includes at least a list of destination lightings units, an ON/OFF control indication and a control messaging protocol mode designation. The received control message is checked to determine if the identification code of the lighting unit is in the list of destination lighting units and if the ON/Off control indication is ON which means that the control message is determined to be the ON control message. The method also includes the step increasing the light level output of the lighting unit based upon the determination of the true location detection and/or the ON control message.

In yet another embodiment, the present invention relates to a method for an outdoor lighting network including a plurality of lighting units. The method includes the steps of detecting an object within a sensing range by at least one of the plurality of lighting units and determining whether to send a control message to one or more other lighting units based upon status information related to the lighting unit from a current and past monitoring period and based upon status data from the one or more other of the plurality of lighting units. The method further includes the step of sending the control message, based upon the determination, to one or more other of the plurality of lighting units to control the lighting in the outdoor lighting network.

In general, the various aspects, features and embodiments of the present invention may be combined and coupled in any way possible within the scope of the invention. The subject matter that is regarded as the invention is particularly pointed out and distinctly claimed in the claims at the conclusion of the specification.

The foregoing and other features and advantages of the invention will be apparent from the following detailed description taken in conjunction with the accompanying drawings.

Figure 1:
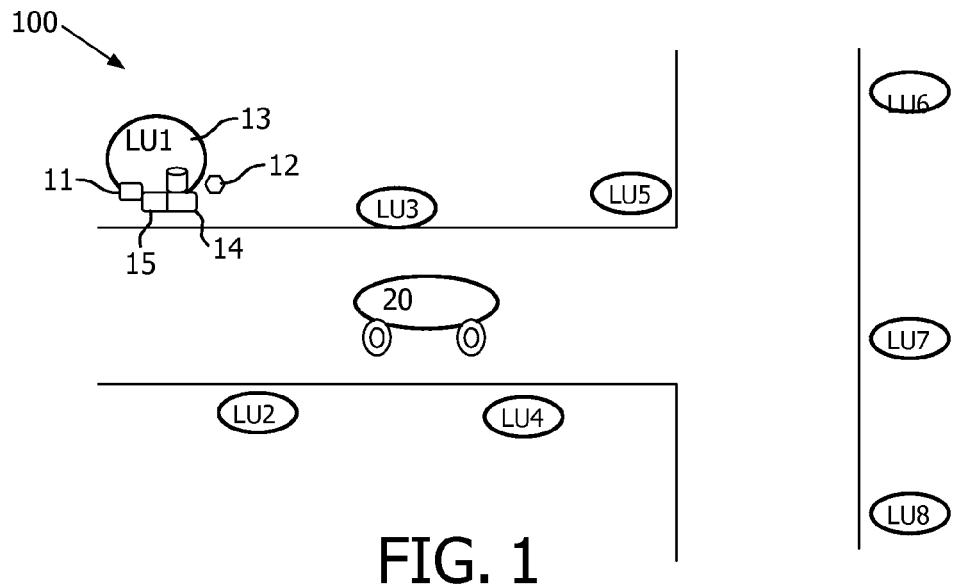
FIG. 1 shows an outdoor lighting network 100 according to an embodiment of the invention.

As shown in FIG. 1, the outdoor lighting network 100 includes one or more lighting units (1-8). The LUs (1-8) include a light producing mechanism 11, a sensor 12, a database 13, a communication interface 14 and a light level controller 15.

In the forgoing description, reference will be made to neighbor and neighboring LUs (1-8). As an example, LU2 is the left neighbor of LU3 and LU4 is the right neighbor of LU3.

The sensor 12 is used to detect one or more object(s) 20 along with their velocities (direction and speed) within a predetermined sensing range. As noted above, the senor 12 may be any suitable sensor to achieve this result.

The communication interface 14 may be, for example, a hardwired link and/or a wireless interface compatible with DSRC, 3G, LTE, WiFi, RFID, another type of wireless communication system and/or a visual light communication. The communication interface 14 may be any suitable communication arrangement to transfer data between one or more of the LUs (1-8).

The database 13 need not be included in all of the LUs (1-8). Since the LUs (1-8) can communicate with one or more other LUs (1-8) and/or an intermediate node (not shown in FIG. 1), any data that would need to be stored or accessed by a particular LU (1-8) can be stored in and accessed from the database 13 in another LU (1-8) or in the intermediate node as needed.

The light level controller 15 is used to adapt the illumination output of the light producing mechanism 11 based upon determinations made in response to detections of the object 20.

In operation, the LUs (1-8) within the outdoor lighting system 100 perform various functions to manage lighting/dimming requirements as needed.

However, before describing various methods, embodiments and protocols of the present invention, some notations, definitions and examples of data formats are described below.

Below is an example memory format that may be used to store detection data from one of the LUs (1-8) and control message data from other LUs (1-10) in the database 13.

In each of the LUs (1-8), one or more of previous iterations (each iteration is considered one monitoring period) of the detection data and status of the LU(s) (1-8) may be stored as shown in Tables 1 and 2. This data and status may be stored in the database 13.

TABLE 1

| iteration | local detection | true local detection | velocity | light(on/off) |
|---|---|---|---|---|
| i | | | | |
| i-1 | | | | |
| i-2 | | | | |
| i-3 | | | | |

The monitoring period to be used will depend on the features and/or location of the OLN 100 and in consideration of the velocity of the objects 20. For example, faster moving objects will require a smaller monitoring period to ensure proper detection as they move through the sensing range.

A stack of several entries (e.g., 10) may be used to store the data from the control messages from the other LUs (1-8) in the database 13 as shown in Table 2.

TABLE 2

| iteration | LU_ID of sender | Local detection | Velocity |
|---|---|---|---|
| I | n | ON/OFF | |

As used hereinafter:

ld(i) denotes a local detection of the object 20 by one of the LUs (1-8) at iteration i;

true_ld(i) denotes a true local detection by the LU at iteration i;

ld(i)=1 means a local detection (i.e., the object 20 has been detected by the sensor 12 at this particular LU) and ld(i)=0 means that the object 20 has not been detected;

true_ld(i)=1 means a true local detection (i.e., the local detection has been confirmed) and true_ld(i)=0 means that the local detection was not confirmed;

light(i) denotes a light status of the LU;

light(i)=1 (or ON) means that the light producing mechanism 11 is turned on (active) at iteration i, light(i)=0 (or OFF) means that the lighting producing mechanism 11 is turned off (inactive or dimmed); and v(i) denotes a velocity of the object 20 detected at iteration i.

In certain situations, as described below, it may be necessary to determine that at least two of the objects 20 have a velocity that is the same or close. For this purpose it can be declared that the two objects 20 with velocities v1 and v2, respectively, are the same or close, if v1 and v2 have the same direction and $$|v1-v2| \leq 0.5 \min(|v1|,|v2|).$$

In addition, in certain situations, it may be necessary to determine that the velocity of the object 20 can be found from data obtained from neighboring LUs (1-8) that is stored in the stack format described above). By traversing the stack data entries in the database 13, it can be determined that the velocity of the object 20 can found from the data obtained from neighboring LUs (1-8) if a stack entry satisfies all of the following four requirements:

1. The stack entry is an "ON" entry (a control message of remote detection of ON is received from at least one of the neighboring LUs (1-8) of the particular LU);
2. The entry is from the left or right neighboring LUs (1-8) (depending on the direction of v(i));
3. v(i) and v(k) are close (where v(k) is the velocity in the stack entry and k is the iteration number for that stack entry); and
4. i-k is less than a limited period of iterations:
   (e.g., round((inter-LU distance)/(abs(v(i))*T))+2, where T is the monitoring period).

One final notation, the sensor 12 can only detect the velocity of the object 20 but cannot detect the exact location of the object 20. In this regard, when there is more than one of the object 20 in the sensing range, if the velocities of the objects 20 are close, the sensor 12 regards both the objects 20 as one object.

The method for deciding when the control message from one of the LUs (1-8) should be send to one or more other LUs (1-8) is now described. The decision method can be broken down into three parts:

Criterion to determine "true" local detection;
Criterion to send ON message; and
Criterion to send OFF message.

The criterion to determine the "true" local detection is to limit the effects of a false detection by the sensor 12. When one of the LUs (1-8) has a local detection, the LU checks in the database 13 for the status of the local detection, the status of light (on/off) in previous iterations and also the stack entries received from the other LUs (1-8) to decide if the local detection (i.e., confirm) is "true" or otherwise a false alarm. Given the local detection at iteration i, five cases may occur which need to be discussed.

Given ld(i)=1 (i.e., the object 20 has been detected in the sensing range by the sensor 12 of the LU (1-8)):

i) If true_ld(i−1)=1, this likely means the LU (1-8) determines a true local detection at previous iteration i−1, so that it is determined/confirmed that: true_ld(i)=1;

ii) If true_ld(i−1)=0 and ld(i−1)=1 and light(i−1)=1, this likely means there is a local detection at previous iteration i−1 and the LU (1-8) decided to turn ON the light at iteration i−1. However, the LU could not confirm ld(i−1) to be a true local detection. If v(i) and v(i−1) are close, set true_ld(i)=1; or if v(i) can be found from neighboring LUs (1-8), set true_ld(i)=1.

iii) If true_ld(i−1)=0 and ld(i−1)=0, this could be due to the object 20 just entering the sensing range of the LU (1-8). If v(i) can be found from the neighbor LUs, true_ld(i)=1 is set.

iv) If the LU (1-8) is on the left end or on the right end of a street then this LU (1-8) has neighbors only on one side and the data in the stack entries is not complete for the determination of a true local detection. To be conservative, true_ld(i)=1 is set. It is noted that a grid map of all the LUs (1-8) in the OLN can be used to identify location characteristics (e.g., end of street) and other unique features of particular LUs (1-8).

v) Otherwise true_ld(i)=0 is set.

The ON message is sent by the LU (1-8) whose "true" local detection (as described in the criterion to determine "true" local detection above) is true_ld(i)=1. In the view of the LU_ID n, when there is a local detection and it is a true local detection, if there is a "new" object 20 that enters the sensing range of the sensor 12 (which means that the sensor 12 detects a new velocity that could not be found in the database 13 of the LU (1-8)) then the LU sends the ON message to other LUs (1-8) within the response range.

To determine whether to send the ON message, two steps are performed by the LU (1-8).

Step 1: First it is noted that the velocities (detected) in current iteration i are denoted as $V_1(i), V_2(i), \ldots V_n(i)$. This example it is assumed that "n" velocities are detected in current iteration by the sensor 12. The velocities of previous iterations v(i−1) (assume "m" previous velocities) in the database 13 are traversed to determine if the first of the "n" current velocities is not close to any of the previous "m" velocities in iteration i−1. If the first of the "n" current velocities is not found close then the first of the "n" current velocities is declared newly detected (i.e., arrived) and the ON message is sent to the neighboring LUs (1-8). This is repeated for all "n" of the current velocities.

Step 2: If m>0 and n>m and in Step 1 the LU (1-8) does not send any ON messages, this means there is a new object 20 (may be more than one) has entered the sensing range of the LU (1-8) but the LU (1-8) does not recognize the object 20 as newly detected. The reason is that the velocity of the newly detected object 20 is close to the velocity in the previous iteration i−1. In this case, the LU (1-8) regards two or more of the objects 20 as the same object having the same velocity. In this case, the ON message is sent along with the largest velocity in current iteration to LUs (1-8) in the response range.

Now the criterion to send the OFF message by the LU (1-8) is described. When the object 20 just leaves the sensing range of the LU (1-8) and there is no other object 20 within the sensing range of the LU (1-8) (i.e. the local detection (ld(i)) of the LU (1-8) turns from 1 to 0), the LU (1-8) sends the OFF message which means that the local detection (ld(i)) of the LU (1-8) is currently 0. The OFF message is sent to the neighboring LUs (1-8) in direction opposite to the direction of the velocity of the object 20.

To determine whether to send an OFF message two steps are performed by the LU (1-8).

Step 1: If ld(i)=0 and true_ld(i−1)=1 and light(i−1)=1, go to Step 2 (which means that the LU (1-8) is not currently detecting the object 20 by the sensor 12 but in the previous iteration there was a true detection and the light was ON); otherwise do not send the OFF message;

Step 2: It is first noted that the velocity in iteration (i−1) is denoted as v(i−1). By traversing the stack entries in the database 13, if v(i−1) can be found from the neighbors LUs (1-8) (see case 1 in the FIG. 2), the OFF message is sent to the neighboring LUs (1-8) in the opposite direction from which the object 20 is moving. If there are no matches, do not send the OFF message.

Figure 2:
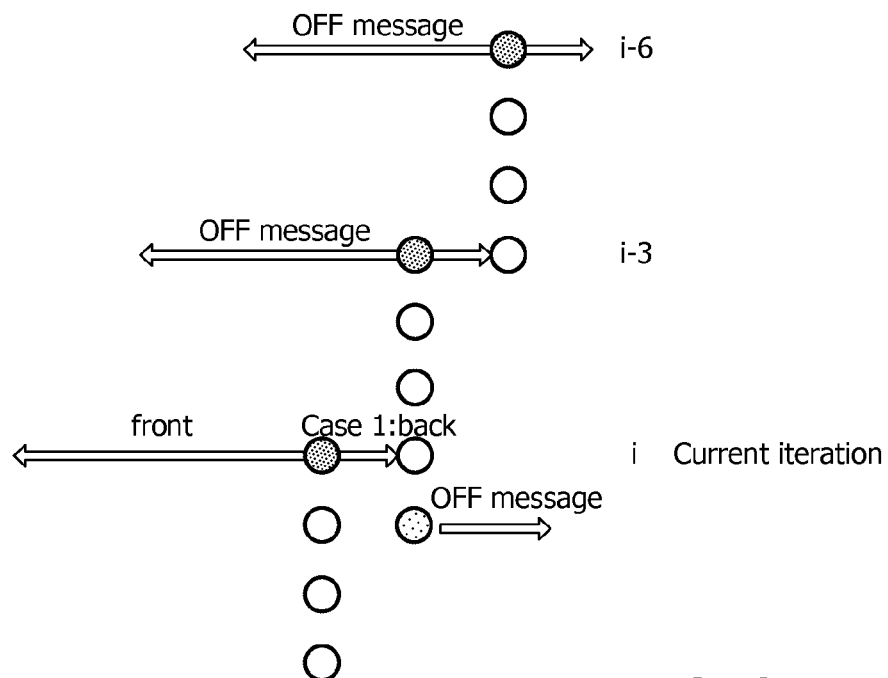
FIG. 2 shows a control message diagram of according to an embodiment of the present invention.

In FIG. 2, the OFF message is sent at iterations i+1, i−2, i−5 by different LUs (1-8). When the noted condition(s) are satisfied, each LU (1-8) sends the OFF message to the neighbors LUs in the direction opposite to the estimated direction of the object 20.

Next the control messaging protocol and message content within a transmission between/among LUs (1-8) is described. Three switch modes for the control messaging protocol are disclosed:

Control messaging protocol mode 1;
Control messaging protocol mode 2; and
P2P protocol mode.

Control messaging protocol mode 1 is used for broadcasting/sending to multiple destinations (i.e., LUs (1-8)) within a short response range when there is less of a need to relay the same control message (packet) between the LUs (1-8) is required. Control messaging protocol mode 2 is used for broadcasting to multiple destinations within a larger response range when there is more of a need to relay the same control message (packet) between the LUs (1-8) is required The response range determines the need for relaying. A short response range means that the control message is relayed to fewer destinations (i.e., LUs) and the furthest destination is close. A large response range means the control message should be relayed to more destinations and more relays are needed to send the control message to the furthest destination.

P2P protocol mode is designed for point to point communication. In typical OLN applications using such protocol modes, if the response range of the LU (1-8) is within a radius of 40 meters, control messaging protocol mode 1 may be used. If the response range of the LU (1-8) is larger than the radius of 40 meters, control messaging protocol mode 2 may be used. If point to point communication is needed, P2P protocol mode may be used.

To determine the response range of the LUs, the velocity of the object 20 must considered to adapt the response range accordingly. This may be done, for example using a predetermined lookup table or algorithm. Table 3 below is an example of a lookup table for the response range of the LUs (1-8).

TABLE 3

| Velocity of the object 20 (m/s) | # of LUs to be turned on: (back, front) | Response time (seconds) |
|---|---|---|
| ≤4 | (1, 1) | |
| 4-10 | (1, 3) | 8 |
| 10-20 | (1, 4) | 5 |
| 20-30 | (1, 6) | 4.66 |
| 30-40 | (1, 8) | 4.5 |

The response time is the amount of time that a driver (of the object 20) needs to react upon seeing a situation at the furthest front LU (1-8) which is turned on. The response time is used to determine the number of front/forward LUs (1-8) (in second column of Table 3) that need to be turned on. This is to allow for a sufficient number of LUs (1-8) to turn on (i.e., light up) to provide visual comfort to the driver under different velocity cases.

Response Time=(LU spacing)*(number of front LUs)/(maximum velocity)

The Response Time can also be derived from the first two columns Table 3 and for a given LU spacing.

A detailed description of each of the control messaging protocol modes is described below.

In the control messaging protocol mode 1 when the destination LU (1-8) receives the control message from the sending LU (1-8) an ACK is sent from the destination LU (1-8) to the sending LU (1-8).

Table 3 shows an example of the control message data format in a human language representation. It will be appreciated by one of ordinary skill in the art that this representation would be translated into a suitable format for analog or digital transmission. In this example, the control message is sent to the two left and right neighbor LUs (i.e., L1, 2 and R1, R2). However, it is noted that the control message can be sent to more or less neighboring LUs (1-8) depending on the response range selected.

As noted above, if (front, back)=(2, 2) is designated to mean the left two and right two neighbors of the LU (1-8) and if the LU_ID of the LU (1-8) with a local detection is n, the format of control message is as shown in Table 3.

TABLE 3

| List of destination LUs | L1, L2, R1,R2 |
|---|---|
| Velocity (speed + direction) | |
| Lamp of local detection | n |
| content | (local detection) ON/OFF |
| Switch mode of Control messaging protocol | 1: Control messaging protocol mode 1; 2: Control messaging protocol mode 2; 3: P2P protocol mode |

In the control messaging protocol mode 1, the sender LU (1-8) sends the control message (via the communication interface 14) to the list of destination LUs (1-8). The sender LU (1-8) stops sending when the ACK is received from all of the destination LUs (1-8). When the sender LU (1-8) receives the ACK from one of the destination LUs (1-8) that particular destination LU (1-8) is not sent the control message again by the sender LU (1-8). This way only the destination LUs (1-8) that have not sent the ACK would receive the repeat control messages from the sender LU (1-8). The sender LU (1-8) may re-send the control message to the destination LUs (1-8) that have not sent an ACK a predetermined number of times, e.g., up to 4 times. This prevents an endless loop situation of one of the destination LUs (1-8) is not able to send the ACK.

When one of the destination LUs (1-8) receives the control message from the sender LU (1-8) (in this case the switch mode would be control messaging protocol mode=1), the destination LU (1-8) compares its own LU_ID with the list of destination LUs (1-8). If a match is found then the following steps are performed:

Step 1: If an internal status flag has a value of less than two (which means that this destination LU (1-8) has not replied with the ACK or has replied once but was not received by the sender LU (1-8)), go to Step 2; otherwise, if the internal status flag has a value of two, stop and do not send the ACK; and Step 2: Increase the value of the internal status flag by 1, store the control message and reply with the ACK to the sender LU (1-8).

When entering next iteration (monitoring period), the value of the internal status flag is reset to zero.

Control messaging protocol mode 2 will now be described. In this mode, each of the LUs (1-8) on the destination list re-sends the control message from the sender LU (1-8) twice without replying ACK to the original sender LU (1-8). The control message contains the list of destination LUs (1-8). When one of the destination LUs (1-8) receives the control message, the destination LU (1-8) re-sends the control message to its neighbors. The neighbor LUs (1-8), however, send the ACK back to the destination LU (1-8) that re-sent the control message.

By way of example, in the control messaging protocol mode 2, when the sender LU (1-8) has a local detection of the object 20 in its sensing region, the LU (1-8) sends the control message to the LUs (1-8) on the list of destination LUs (1-8). In this example, it is assumed that the LU_ID of the sender LU (1-8) with the local detection is n, and (front, back)=(6, 1) which means that the list destination LUs (1-8) would be L1, L2, L3, L4, L5, L6, R1 (the six left neighbors and one right neighbor of the sender LU (1-8)). When one of the destination LUs (1-8) receives the control message from the sender LU (1-8) (in this case the switch mode of control messaging protocol mode=2), the destination LU (1-8) compares its own LU_ID with the list of destination poles in the control message. If there is a match, the destination LU performs the following steps:

Step 1: If the internal status flag has a value of zero (which means that this destination LU (1-8) has not re-sent the control message to its neighbor LUs (1-8)), go to Step 2; otherwise, if the value of the internal status flag is one, stop and do not re-send the control message; and Step 2: The destination LU (1-8) stores the control message, re-sends the control message two consecutive times to the neighboring LUs (1-8) and sets the value of the internal status flag to one (when entering next iteration (monitoring period), the value of the internal status flag is reset to zero).

It is noted that in Step 2 above, the control message is sent twice to increase the overall success rate of the communication by relaying, while still keeping the retransmission overhead minimal. However, two re-sends are not required and more or less re-sends can be used. The number of re-send depends on the success rate of a single communication and a requirement on overall success rate by relaying.

Step 3: If the value of the destination LU's LU_ID is different from the value of the LU_ID of the sender LU (1-8) by one (which means that the destination LU (1-8) and the sender LU (1-8) are neighbors), reply with the ACK to the sender LU (1-8).

If the sender LU (1-8) does not receive the ACK from two neighboring LUs (1-8) within the monitoring period, the P2P protocol mode is initiated between the sender LU (1-8) and the neighboring LU (1-8) that did not reply with the ACK.

One advantage of the control messaging protocol mode 2 is that it ensures fast communication to the furthest LU (1-8) within the response range. The control messaging protocol mode 2 is also robust considering that the LUs (1-8) receive the control message from several neighbor LUs (1-8).

In another embodiment, the control messaging protocol mode 2 may also include an ACK (acknowledgement) mechanism between the original sender LU (1-8) and the destination LUs (1-8).

Figure 3:
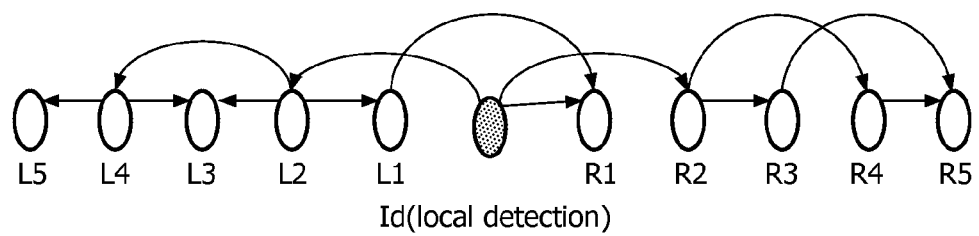
FIG. 3 shows a control message decision diagram method according to another embodiment of the invention.

The control messaging protocol mode 2 can also be used for a dynamic communication range as shown in FIG. 3. FIG. 3 shows an example where the sender LU (in black) needs to send the control message to ten neighbor LUs. There are multiple routes of relaying the control message to different destinations, which provides robustness of communication.

The P2P Protocol Mode will now be described. The P2P Protocol Mode may be initiated in at least two situations:

Situation 1. In the control messaging protocol mode 2, the sender LU (1-8) (which is not the original sender LU (1-8) of the control message as described above) does not receive the ACK from two neighboring LUs (1-8); and Situation 2. When the status of the local detection of the LU (1-8) changes from ON to OFF, the LU (1-8) sends an OFF message to the neighboring LUs (1-8) which are in the reverse direction of the velocity of the object 20. The LU (1-8) stops sending the OFF message when the LU (1-8) receives all the ACKs from the destination LU (1-8). However, a limit may be sent on the number of times (e.g., 6 times) the LU (1-8) sends the OFF message even if all the ACKS are not received. This prevents an endless loop situation if for any reason one or more of the destination LUs (1-8) cannot respond with the ACK.

Table 4 shows an example of the OFF message. In this example, the LU_ID of the sender LU (1-8) with a local detection is n and the velocity is taken from the database 13 from the previous iteration.

TABLE 4

| List of destination LUs | R1 |
| --- | --- |
| Velocity(speed + direction) | * |
| Lamp of local detection | n |
| content | (local detection) ON/OFF |
| Switch mode of Control messaging protocol | 1: Control messaging protocol mode 1; 2: Control messaging protocol mode 2; 3: P2P protocol mode |

When the destination LU (1-8) receives the control message that includes Switch mode of Control messaging protocol mode=3, if the LU_ID of the LU (1-8) is on the list of destination LUs (1-8), the destination LU (1-8) performs the following steps:

Step 1: If the internal status flag has a value of less than two (which means that this LU (1-8) has not re-sent the control message or has replied once with the ACK but the ACK was not received by the sender LU (1-8)), go to Step 2; otherwise, if the value of the internal status flag is 2, stop and do not take further action;

Step 2: increase the value of the internal status flag by 1, store the control message and reply to the sender LU (1-8) with the ACK (the internal status flag is reset to zero in the next iteration, i.e., monitoring period).

The decision rule for dimming/light level control for the LUs (1-8) in the OLN will now be described. The following set of decision rules are employed by the LUs (1-8):

(1) If local detection(i)=ON, then light(i)=ON;

(2). else if the ON message is received from one of the neighbor LUs (1-8) in current iteration i, then light(i)=ON;

(3). else if the OFF message is received in the current iteration i and all ON entries in the stack have been deactivated then light(i)=off (i.e., reset the light from ON to OFF);

(4). else if: local detection(i)=OFF and light(i−1)=ON and no OFF message is received in the current iteration i and all ON entries in the stack have been deactivated then light(i)=OFF (i.e., reset the light from ON to OFF);

(5). else: light(i)=light(i−1) (keep the light status the same).

Cases (1) and (2) are two cases to set the light to be ON. Cases (3) and (4) are two cases to reset the light from ON to OFF. Case (5) includes all other cases that maintain the status of the light.

It is also noted that in the above example, the status of the LU (1-8) (light) is described as "ON" or "OFF." However, it should be understood that "OFF" means that the light level from the light producing mechanism 11 is reduced from the light level when the light producing mechanism 11 in the "ON" state. For example, in the "ON" state, the light level may be full power.

Testing results will now be described comparing embodiments of the present invention with a conventional method for dimming/controlling the LUs (1-8). In this test comparison, the following system parameters have been used:

(1) number of iterations: m=5000 times;
(2) number of LUs: n=80 with the LUs arranged along on one side of a straight road;
(3) period T=0.25 seconds (i.e., the monitoring period);
(4) inter-LU distance apart=20 m;
(5) success probability for a single communication between two of the LUs within communication range=0.8 (i.e., 80%);
(6) sensing range of the LUs (1-8): radius=15 m;
(7) miss detection probability of a local detection=0.05 (i.e., 5%);
(8) false alarm probability of a local detection=0.05 (i.e., 5%);
(9) traffic mode: Busy mode. On average, every time there are seven vehicles (i.e., the objects 20) on the road of 80 LUs (1-8);
(10) communication range of the LUs (1-8): radius <=40 m;
(11) response range of the LUs (1-8) based on the velocity of the vehicle (see look up Table 5 below); and

TABLE 5

| Velocity (m/s) | # of LUs to be turned on :(back, front) | Response time (seconds) |
|---|---|---|
| ≤4 | (1, 1) | |
| 4-10 | (1, 3) | 8 |
| 10-20 | (1, 4) | 5 |

TABLE 5-continued

| Velocity (m/s) | # of LUs to be turned on :(back, front) | Response time (seconds) |
|---|---|---|
| 20-30 | (1, 6) | 4.66 |
| 30-40 | (1, 8) | 4.5 |

(12) uncertainty of detection of the velocity of vehicle: +/−20%. In this test example, it is assumed that the actual velocity is Va, then, the detected velocity Vd∈(0.8 Va, 1.2 Va) with a probability of uniform distribution.

It is noted that with the monitoring period of 1=0.25 and 5000 iterations, the total time to complete the test was 1250 seconds.

Embodiments of the present invention are compared with the conventional method for dimming/controlling the LUs (1-8) on the basis of four performance metrics:

1). Type-I Error Rate: a/b

"a" are situations in which the LU (1-8) is turned OFF but one or more the objects 20 appear within the response region of the LU (1-8); and where "b" is defined as m*n (m is the number of iterations and n is the total number of the LUs).

2). Type-II Error Rate: a/b

For type II errors, "a" are situations in which the LU (1-8) is turned ON but no object 20 appears within the response region of the LU (1-8). It is noted that for calculation of the type II errors, the three LUs on left end and the three LUs on right end of the street are not accounted due to an end effect. "b" is defined as m*(n−2*3).

3). Energy Percentage of Non-Control Energy Cost: a/b*100%

For this performance metric, "a" is the number of the LUs (1-8) that have been turned ON throughout all the iterations and where "b" is defined as m*n. For "b," this assumes that all the LUs (1-8) are turned ON all the time.

4). The Total Number of Sent Control Messages by all the LUs (1-8).

In this test comparison, the velocities of the vehicles (i.e., the objects 20) are generated by following a normal distribution with the mean value 18 m/s and standard deviation of seven. This means that the average response range, i.e. the average number of response LUs (1-8) when a local detection occurs is about six (e.g., it would be five for speeds in the range of 20-30 m/s and seven for speeds in the range of 30-40 m/s).

For the conventional method for dimming/controlling the LUs (1-8), two response standards are used in the test comparison. The first response standard is to turn ON the left three and right three LUs (1-8) if a local detection occurs. The second response standard is to follow the same lookup Table 5 as described above in connection with various embodiments of the present invention.

As can be seen by the summary in Table 6 below, embodiments of the present invention have better performance in all four performance metrics.

TABLE 6

| | | Embodiment of present invention Lookup Table 5 of relation of response range and velocity | Conventional method Response range of left 3 and right 3 poles | Conventional method Lookup Table of relation of response range and velocity |
|---|---|---|---|---|
| | Response standard | | | |
| Results | Type-I error rate | 0.0582% | 0.7100% | 4.4900% |
| | Type-II error rate | 4.470% | 18.26% | 8.12% |
| | Energy percent of non-control energy cost | 37.920% | 55.64% | 37.28% |

TABLE 6-continued

| Response standard | Embodiment of present invention Lookup Table 5 of relation of response range and velocity | Conventional method Response range of left 3 and right 3 poles | Conventional method Lookup Table of relation of response range and velocity |
|---|---|---|---|
| Total sent messages | 94278 | 800000 | 910540 |
| Total ACK messages | 29701 | 0 | 0 |

In yet another embodiment, control rules and methods are described based upon binary detection sensing. The decision criterion for sending the control message will first be described. In this embodiment, The LU (1-8) sends only a 'local detection' (ld) control message and no transmission occurs if no object 20 is detected by the LU (1-8). To improve the likelihood that the local detection is valid, the following criteria are used.

Given a local detection, there are three cases in which the control message is transmitted, i.e. an ON message is sent from that LU. In the following,

(indicates checking of a detection the object 20 either remotely or locally)

(indicates a local detection of the object 20 or remote detection is found)

If there is one or more red boxes in a region of blue boxes, the local detection at iteration i is a "True" local detection.

If any one of the following three cases is satisfied (indicating that the local detection is a "True" local detection), then send the control message (i.e., the ON message) to neighbor LUs (1-8), i.e. if "True" local detection=1, broadcast ON message to neighbor LUs (1-8).

1) If ld(local detection)(i)=1, ld(i−1)=1, then first, check local detections for iterations from i−2 to i−3. Either ld(i−2)=1 occurs, or else ld(i−2)=0 and ld(i−3)=1, in which case it is likely that the object 20 (e.g., a vehicle) stays within the sensing range of the LU for a period of time and only one miss detection at iteration i−2.

If no local detection at iteration i−2 and i−3, check neighbor LUs (L1 and R1) for iterations from i−2 to i−3. This situation likely indicates that, with a high probability, the object 20 has just arrived at the LU (Id) at iteration i−1 (ld(i−1)=1) from L1 (first left neighboring LU) or R1 (first right neighboring LU).

| iteration | L1 | ld | R1 |
|---|---|---|---|
| i-3 |  |  |  |
| i-2 |  |  |  |
| i-1 |  | 1 |  |
| i |  | 1 |  |

2) If ld(i)=1, ld(i−1)=0, check local detections for iterations from i−2 to i−3. If ld(i−2)=1 or ld(i−3)=1, ld(i−1)=0 is a likely missed detection.

If no local detection is found, check remote detection from L1 and R1 for iterations from i−1 to i−3. It there is a remote detection, it is likely that a vehicle just arrived at the LU (Id) at iteration i (ld(i)=1) from L1 (first left neighboring LU) or R1 (first right neighboring LU).

| iteration | L1 | ld | R1 |
|---|---|---|---|
| i-3 |  |  |  |
| i-2 |  |  |  |
| i-1 |  | 0 |  |
| i |  | 1 |  |

3) If the LU of left end or right end on the street has a local detection, it broadcasts the ON message. This is for the case that the object 20 enters from an end of the street where LUs (1-8) have neighbors only on one side of the street.

If at least one of the above conditions are met then the control message is one or more times. It is preferred that the control message is broadcast twice to improve the likelihood of proper reception by the receiving LUs (1-8). The control message contains a list of LUs that are destinations (i.e., the receiving LUs (1-8)). See Table 7 below for an example format of the control message in this embodiment. In this example, If LU_ID of the LU (1-8) with the local detection is n and the response range is R=3 then the control message has the following format:

| List of destination LUs | L1, L2, L3, R1, R2, R3 |
|---|---|
| LU of local detection content | N (local detection) ON |

When a particular LU (1-8) has a local detection of the object 20 in its sensing region, the LU (1-8) broadcasts the control message to all LUs (1-8) in the list of destination LUs. When one or more LUs (1-8) receive the control message, the receiving LU(s) (1-8) compares its own LU_ID with the list of destination LUs. It the receiving LU(s) 1-8) are on the list of destination LUs, the following steps are performed:

Step 1: If the internal status flag is 0 (i.e., the control message has not been resent yet), go to Step 2; otherwise, if the internal status flag is 1, stop and do not resend the control message; and Step 2: stores the control message, resent the control message (preferably two consecutive times) and set the internal status flag to 1 (when entering the next monitoring period, the internal status flag is reset to 0).

The decision rule for dimming/light level control for the LUs (1-8) in this embodiment now be described. The following set of decision rules are employed by the LUs (1-8):

(1) If: local detection(i)=ON then light(i)=on;
(2) else if: the control message (i.e., the ON message) is received from a neighbor LU (1-8) in current iteration I then light(i)=on;
(3) else if: there is no local detection and remote detection (the ON message received from left three or right three neighbor LU (depending on the response range)) in three consecutive times (for iteration i, i−1, i−2) and light(i−1)=on then light(i)=off (reset the LU (1-8) from ON to OFF);
(4) else if: no local detection and remote detection in iteration i and i−1 but at iteration i−2 there is a remote detection from neighboring L3 (the third left LU (1-8)) or R3 (the third right LU (1-8)) then light(i)=off (reset the LU (1-8) from ON to OFF); and
(5) else: light(i)=Light(i−1) (LU (1-8) status stays the same).

Cases (1) and (2) above are two cases to set the LU (1-9) to be ON and Cases (3) and (4) are two cases to reset the LU (1-8) from ON to OFF. Case (5) includes all the other cases that maintain the status of the LU (1-8).

Figure 4:
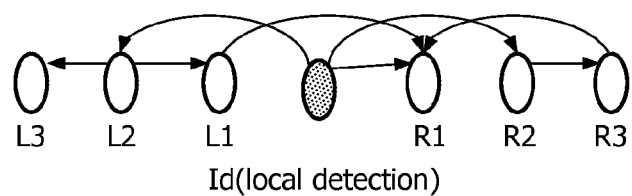
FIG. 4 shows a control message decision diagram method according to yet another embodiment of the invention.

One advantage of this embodiment is that it ensures fast communication to the furthest LU (1-8) within the response range. It is further robust due to the fact that the LU (1-8) receives control message from several neighbor LUs (1-8). The embodiment may be further made robust by introducing an optional ACK (acknowledgement) mechanism, wherein a successful transmission is ACKed by the receiving LU (1-8). It can further be adapted to a dynamic communication range as shown in FIG. 4.

Testing results for this embodiment will now be described comparing embodiments of the present invention with a conventional method for dimming/controlling the LUs (1-8). In the test comparison for this embodiment, the same system parameters (1)-(10) have been used as noted above. System parameters (11) and (12) have been replaced with:

(11a) Response range of LUs (1-8): Radius=60 m, i.e. left three and right three LUs (when there is the object 20 within the sensing range of the LU, the left three and right three LUs (1-8) should be turned ON).

The same four performance metrics are used as in the previous test comparison.

In this test comparison, two cases for the reference protocol are considered. In the first case, the probability of successful communication=0.8, probability of missed detection=0.05 and probability of false alarm=0.05. In the second case, the probability of successful communication=0.9, probability of missed detection=0.01 and probability of false alarm=0.05. The second case corresponds to a situation where communication sensing reliability has been improved by careful configuration/commissioning. For the reference protocol, the control message is broadcast two times (a similar comparison with the embodiment of the present invention) and also that the response range is R=3 (again, so that the response range comparison is maintained). In practice, this is a deficiency of the reference protocol in that it cannot guarantee a response range.

As can be seen by the summary in Table 8 below, embodiments of the present invention have better performance in all four performance metrics.

TABLE 8

| | | Reference algorithm[1] | Reference algorithm[2] | Embodiment of the present invention |
|---|---|---|---|---|
| Parameters | Communication success probability | 0.8 | 0.9 | 0.8 |
| | Miss detection | 0.05 | 0.01 | 0.05 |
| | False alarm | 0.05 | 0.05 | 0.05 |
| Results | Type-I error rate | 0.7100% | 0.1400% | 0.0502% |
| | Type-II error rate | 18.26% | 18.27% | 2.48% |
| | Percentage of non-control energy cost | 54.64% | 56.22% | 40.77% |
| | Total sent messages | 8.00E+05 | 8.00E+05 | 5.153E+05 |

The foregoing detailed description has set forth a few of the many forms that the invention can take. The above examples are merely illustrative of several possible embodiments of various aspects of the present invention, wherein equivalent alterations and/or modifications will occur to others skilled in the art upon reading and understanding of the present invention and the annexed drawings. In particular, regard to the various functions performed by the above described components (devices, systems, and the like), the terms (including a reference to a "means") used to describe such components are intended to correspond, unless otherwise indicated to any component, such as hardware or combinations thereof, which performs the specified function of the described component (i.e., that is functionally equivalent), even though not structurally equivalent to the disclosed structure which performs the function in the illustrated implementations of the disclosure.

The principles of the present invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. For example, the LUs (1-10) may be implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Although a particular feature of the present invention may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising".

The present invention has been described with reference to the preferred embodiments. However, modifications and alterations will occur to others upon reading and understanding the preceding detailed description. It is intended that the present invention be construed as including all such modifications and alterations. It is only the claims, including all equivalents that are intended to define the scope of the present invention.

The invention claimed is:

1. A method for controlling a plurality of lighting units in an outdoor lighting network, the method comprising the steps of:
   detecting at least one object within a sensing range by at least one of the plurality of lighting units);
   dynamically determining a response range based upon a velocity of the as least one object after detection;
   confirming if the detection of the at least one object is true by checking a previous local detection status and/or a previous light level status of the at least one of the plurality of lighting units and/or status data received from others of the plurality of lighting units to confirm if the detection of the at least one object is true;
   selecting one of a plurality of messaging protocols based upon the determined response range; and
   sending a control message, using the selected one messaging protocol, to another one or more of the plurality of lighting units to control a light level of the another one or more of the plurality of lighting units.

2. A method for controlling a plurality of lighting units in an outdoor lighting network, the method comprising the steps of:
   detecting at least one object within a sensing range by at least one of the plurality of lighting units);
   dynamically determining a response range based upon a velocity of the as least one object after detection;
   selecting one of a plurality of messaging protocols based upon the determined response range;
   sending a control message, using the selected one messaging protocol, to another one or more of the plurality of lighting units to control a light level of the another one or more of the plurality of lighting units; and
   wherein the determining the response range step includes selecting the response range using the velocities of two or more objects to adapt the respective response range for each object.

3. The method according to claim 2, wherein the selecting one of a plurality of messaging protocols step includes selecting a first protocol when the response range is a first range and selecting a second protocol when the response range is a second range that is larger than the first range.

4. The method according to claim 3, wherein the selecting one of a plurality of messaging protocols step further includes selecting a third protocol when a predetermined condition is not met while in the second protocol.

5. The method according to claim 3, wherein the selecting one of a plurality of messaging protocols step further includes selecting the third protocol to send a second type of control message to reduce the light level of the another one or more of the plurality of lighting units.

6. A method for controlling a light level output of a lighting unit in an outdoor lighting network, the method comprising the steps of:
   determining if there is a true location detection and/or an ON control message is received by the lighting unit where;
   determining the true location detection includes the steps of detecting an object within a sensing range of the lighting unit and confirming that the detection of the object is true;
   determining the ON control message includes the steps receiving a control message from another lighting unit in the outdoor lighting network, wherein the control message includes at least a list of destination lightings units, an ON/OFF control indication and a control messaging protocol mode, checking if an identification code of the lighting unit is in the list of destination lighting units and if the ON/Off control indication is ON which means that the control message is determined to be the ON control message; and
   increasing the light level output of the lighting unit based upon the determination of the true location detection and/or the ON control message.

7. The method according to claim 6, further comprising the step of sending the ON control message to at least one other lighting unit if the light level out of the lighting unit is increased in the increasing step.

8. The method according to claim 6, further comprising the steps of:
   determining if at least one of two OFF conditions have been met by the lighting unit:
   determining the first OFF condition includes the steps of receiving an OFF message in a current monitoring period and verifying that the OFF control message was received by the lighting unit from any other lighting unit that had previously send the ON control message to the lighting unit;
   determining the second OFF condition includes the steps of determining that there no true local detection by the lighting unit verifying that the light level of the lighting unit was increased in a previous monitoring period and that in the current monitoring period the lighting unit the OFF control message was received from any other lighting unit that had previously send the ON control message to the lighting unit; and
   reducing the light level output of the lighting unit based upon the determination of the first and/or second OFF condition.

9. The method according to claim 6, wherein the step to confirm that the detection of the object is true includes checking a prior detection status and/or a prior light level status of the lighting unit from previous monitoring period and/or status data received from one or more other lighting units in the outdoor lighting network to confirm if the detection of the at least one object is true.

10. The method according to claim 9, wherein the status data received from the one or more other lighting units includes an indication of the previous monitoring period, an identification code for the other lighting unit, an ON/OFF status indication and information on a velocity of the object.

11. A method for an outdoor lighting network including a plurality of lighting units, the method comprising the steps of:
   detecting at least one object within a sensing range by at least one of the plurality of lighting units;
   determining whether to send a control message to one or more other of the plurality of lighting units based upon status information related to the lighting unit from a current and a past monitoring period and/or based upon control data from the one or more other of the plurality of lighting units; and selecting one of a plurality of messaging protocols based upon a response range, the response range being based upon at least one velocity of the at least one object; and sending the control message using the selected messaging protocol, to the one or more other of the plurality of lighting units to control lighting in the outdoor lighting network.

12. The method according to claim 11, wherein, if there are two or more objects, the determining step includes the step of traversing two or more velocities of the objects and if one or more of the velocities is determined to be a new velocity, sending the control message.

13. The method according to claim 12, wherein in the determining step if a first velocity of the at least one object is considered close to second velocity already detected from another object, sending the control message with the first or second velocity depending on which is larger.

14. The method according to claim 11, wherein the control message include a list of the one or more other of the plurality of lighting units intended to receive the control message, velocity information of the at least one object, status information of the at least one of the plurality of lighting units.

15. The method according to claim 14, wherein the determining step further includes selecting the list of the one or more other of the plurality of lighting units based upon a response range that is adapted in accordance with a velocity of the at least one object.

16. The method according to claim 11, wherein in the determining step first checks if the local detection in the current and an immediately previous past monitoring period by the at least one of the plurality of lighting units that detected the object, if yes then checks if the local detection was also made in another past monitoring period, and if yes, it is determined to send the control message.

17. The method according to claim 16, wherein if the determining step there is no local detection in the another past monitoring period, the control data from the one or more other of the plurality of lighting units is checked if the object was detected in the another past monitoring period by the one or more other of the plurality of lighting units and if the object was detected, it is determined to send the control message.

18. The method according to claim 11, wherein in the determining step first checks if the local detection in the current and not in an immediately previous past monitoring period by the at least one of the plurality of lighting units that detected the object, if yes then checks if the local detection was also made in another past monitoring period, and if yes, it is determined to send the control message.

19. The method according to claim 18, wherein if the determining step there is no local detection in the another past monitoring period, the control data from the one or more other of the plurality of lighting units is checked if the object was detected in the immediately previous past monitoring period or the another past monitoring period by the one or more other of the plurality of lighting units and if the object was detected, it is determined to send the control message.

* * * * *